United States Patent [19]

Andersson et al.

[11] 3,999,949
[45] Dec. 28, 1976

[54] PRODUCT FOR USE IN CHEMICAL WORKING OPERATIONS

[75] Inventors: Karl Gosta Bertil Andersson, Halmstad; Nils Arvid Norman Björk, Taby, both of Sweden

[73] Assignee: Duni-Bilå AB, Halmstad, Sweden

[22] Filed: Dec. 27, 1974

[21] Appl. No.: 536,981

[30] Foreign Application Priority Data

Jan. 16, 1974 Sweden .............................. 7400571

[52] U.S. Cl. .............................. 23/259; 23/253 TP; 141/1; 141/90; 222/148; 428/40; 428/138; 428/354; 428/537

[51] Int. Cl.² ................... B01L 11/00; G01N 31/00

[58] Field of Search ........... 23/253 TP, 259, 253 R; 141/90, 1; 222/148; 73/425.4 P; 428/40, 138, 354, 537

[56] References Cited

UNITED STATES PATENTS

| 2,624,656 | 1/1953 | Andrews et al. .................... 23/259 |
| 3,152,940 | 10/1964 | Abel et al. ........................ 428/40 X |
| 3,194,872 | 7/1965 | Garner ............................ 428/138 X |
| 3,547,781 | 12/1970 | Guigan et al. .................... 23/259 X |
| 3,552,212 | 1/1971 | Öhlin .............................. 23/259 UX |
| 3,572,998 | 3/1971 | Anthon ............................... 23/259 |
| 3,753,657 | 8/1973 | Downing et al. ................. 23/253 R |
| 3,842,680 | 10/1974 | Vollick et al. .................... 23/259 X |

Primary Examiner—Wilbur L. Bascomb, Jr.
Assistant Examiner—Barry I. Hollander
Attorney, Agent, or Firm—Toren, McGeady and Stanger

[57] ABSTRACT

A product employable in chemical working operations, for instance pipetting, where one or several devices are moved between, inserted into and withdrawn from a plurality of liquid containers arranged in a row, with the product preventing undesirable transfer of liquid between the containers. The product includes a layer of an absorbent material covering the openings into the liquid containers and closely engaging the devices to wipe off and clean their exteriors. The layer of absorbent material is fixed to a supporting layer provided with oval holes arranged to register with the openings into the liquid containers.

8 Claims, 4 Drawing Figures

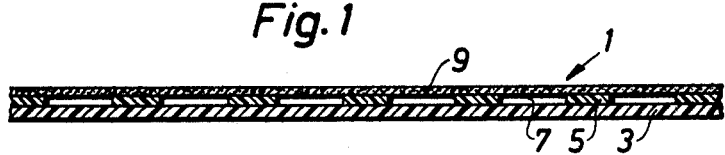
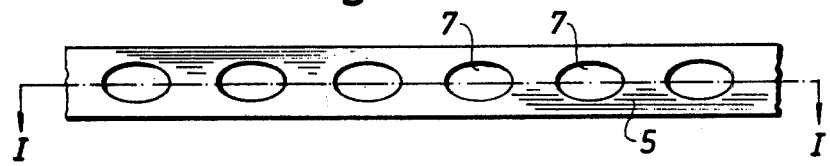
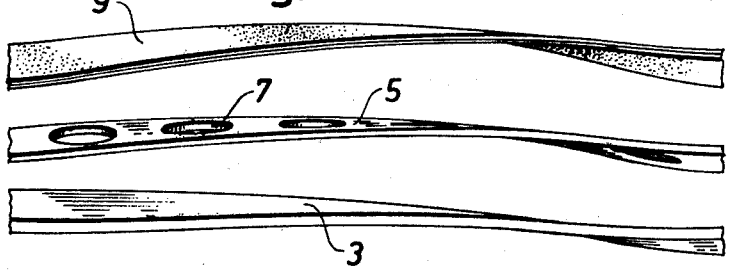
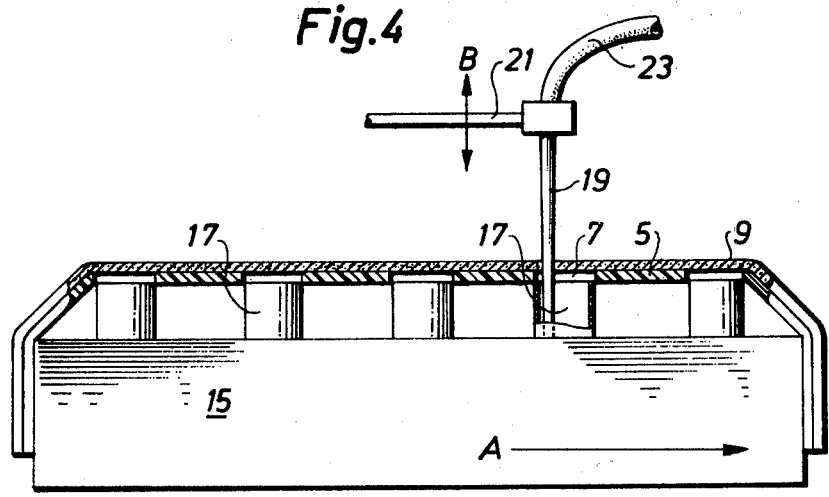

PRODUCT FOR USE IN CHEMICAL WORKING OPERATIONS

The present invention refers to a process and a product or device for use in chemical working operations, for instance pipetting, where one or several means, such as pipettes, are moved between and inserted into and withdrawn from a plurality of liquid containers placed in a row. The invention has for its purpose to prevent non-desirable transfer of liquid between the liquid containers via the intermediation of the exterior of the means.

An important drawback in chemical working operations of different kinds, for instance serial dilution, wherein by means of the pipette a certain amount of liquid is withdrawn from a container and thereafter transferred to the next container, a certain amount of liquid being withdrawn from said next container and transferred to a third container etc., is the fact that the successive lowering of the pipette into different containers results in liquid being transferred from one container to a subsequent container, which results in contamination or erroneous concentrations. This can result in systematic errors in measurements, which in turn may lead to serious consequences in the form of erroneous diagnoses based on such measurements.

Several processes are known for eliminating or reducing such disadvantages. One method consists in lowering the pipette into some form of rinsing bath between each transfer of liquid. The disadvantage of this method is that an extra working step must be carried out, which results in non-desirable time delay and, moreover, is associated with difficulties in maintaining the contents of contaminants in the rinsing bath below an acceptable level. Another method consists in wiping off the pipette between the successive lowerings into the liquid containers, for instance by means of the band wiped against the point of the pipette between the immersions. This latter method results, however, in the inconvenience that the apparatus becomes relatively complicated and thereby expensive.

The purpose of the present invention is to provide a process and a product, which enable avoiding the above indicated disadvantages without introducing any auxiliary working step. The invention is in principle based on an arrangement, wherein the openings of the liquid containers utilized in the chemical working operation in question are covered with an absorbent material layer, through which the means in question, for instance the pipette, is passed so that its exterior is wiped off and cleaned. The cover material layer preferably includes a sheet or a strip comprising an absorbent or suctorial material, for instance fibers of cellulose or other absorbing material. A particularly suitable material is an absorbent, porous paper, for instance so-called tissue.

In a particularly preferred embodiment of the invention a product is used comprising such absorbent material and a supporting layer connected thereto, said supporting layer being preferably apertured in the areas juxtaposed to the respective liquid containers.

A very useful embodiment of the product of the invention consists of an absorbent, porous paper, a supporting layer connected thereto and provided with oval apertures in the areas in juxtaposition of the respective liquid containers and a layer of pressure sensitive adhesive arranged on the outer surface of the supporting layer, said adhesive layer optionally being protected by a removable protective layer. This embodiment results in the advantage that the sheet or strip may be attached in position over the liquid containers in a simple and easy manner.

The invention will now be described with reference to the appended drawing illustrating a particularly preferred embodiment of the invention.

FIG. 1 shows a section taken along line I—I in FIG. 2 a side view of a protective strip made in conformity with the invention.

FIG. 2 shows in a horizontal view the same protective strip seen from below, the protective layer being removed.

FIG. 3 shows the same protective strip in an exploded view.

FIG. 4 shows diagrammatically in a side view the invention applied to pipetting carried out in connection with a test tube holder containing a row of test tubes.

The protective strip 1 shown in FIG. 1 in a side view in the form of a longitudinal section consists in principle of three layers, namely one layer 9 of a penetratable, absorbent material, an intermediate supporting layer 5 having oval holes 7 and a removable protective layer 3. Layer 9 is permanently attached to the supporting layer 5 in any suitable manner, for instance by some type of binder. The supporting layer 5 which is provided with a row of oval holes 7 (FIG. 2) corresponding to the row of test tubes, the openings of which are to be covered by means of the strip, is on its lower surface provided with a pressure sensitive adhesive for the fixation of strip 1. In order to protect said layer of pressure-sensitive adhesive during storage and transportation of the strip, a protective layer 3 of a conventional type is attached to the lower surface of the adhesive layer, said protective layer being easily removable by hand from strip 1, when used. The protective layer is suitably a release paper treated with silicon on the upper surface, as seen in FIG. 3. Further, in FIG. 3 the layer 9 is shown made up of two separate layers.

Layer 9 being the active constituent of strip 1 is made of a suctorial or absorbent material, such as a porous fiber material. Thus, layer 9 may consist of a material of cellulose base, for instance some form of porous paper, such as so-called tissue, but can also consist of any form of film or non-woven material or combinations thereof. As regards porous paper materials, such as tissue, a suitable specific weight is about 10 g/m$^2$ or more, and layer 9 may be composed of several part-layers to the formation of a composed layer having a correspondingly high specific weight. A high absorption capacity is, of course, desirable in layer 9. The absorption capacity may be improved by the additional surfactants, which for instance may be of a non-ionic, cationic or anionic character.

Provided that layer 9 consists of a material having sufficient strength the supporting layer 5 may, of course, be excluded, in which case the layer of pressure-sensitive adhesive is attached directly to the lower surface of layer 9. The wet-strength of paper materials may be improved by the addition of wet strengtheners, for instance carbamide, melamine or polyamide resins. Since the material of layer 9 when using the product comes into contact with liquid the wet-strength thereof is of interest, and generally the wet-strength should be at least 3 % of the dry strength of the material, i.e. its strength in a dry condition.

The supporting layer 5 may be made of a variety of materials, such as plastic, craft paper etc., and the only requirement put on the material in this layer is that it shall possess a certain strength in order to fulfill its function as a support for the absorbent layer 9. The product of the invention may in the form shown in FIGS. 1-3 easily be presented in the form of storage rolls, from which desired lengths are torn in connection with the use of the product.

FIG. 4 shows a practical application of the invention in connection with pipetting in relation to a row of test tubes. In a test tube holder 15 of conventional design five test tubes 17 are placed in a row. The test tube holder 15 shown is positioned in an automatic analyzer, wherein the holder with associated test tubes is indexed forwardly in connection to a pipette 19 attached to a pipette holder 21, which is vertically reciprocable (arrow B in FIG. 4). Moreover, the pipette holder 21 is assumed to be rotatable perpendicular to the plane of the figure, so that when liquid is sucked up by means of the sucking hose 23 the pipette may be lifted and rotated, so that the liquid withdrawn may be transferred to measuring vessels not shown for analysis therein. During this transfer the test tube holder 15 is indexed one step in direction of the horizontal arrow A, so that pipette 19 when rotated back will be lowered into the following test tube 17.

FIG. 4 shows a strip in conformity with FIGS. 1-3 applied across the openings of the five test tubes 17 in a manner clear from FIG. 4. Before the application the strip has been freed from the protective layer 3, while exposing the pressure-sensitive adhesive, in view of which the strip can be applied to the test tubes and the test tube holder 15 in the manner shown. When applying the strip it should, of course, be controlled that openings 7 of the supporting layer 5 will come in juxtaposition to the openings of test tubes 17.

When applying the present invention, as illustrated as example in FIG. 4, the risk that liquid via the pipette 19 is transferred between the different test tubes is effectively eliminated. Thus, when the pipette when lowered into a test tube penetrates the absorbent layer 9 it will be effectively wiped off by layer 9 both when lowered into the test tube and when lifted up therefrom. It is obvious that the material of layer 9 should have such characteristics as to closely engage the pipette and that it also should have absorbing characteristics, so that liquid from the exterior of the pipette will be absorbed into the material.

As is clear from FIG. 2, in the embodiment of the drawing the supporting layer 5 is provided with oval apertures 7 intended to be positioned opposite to the openings of test tubes 17. The longitudinal direction of the apertures 7 is oriented in the direction of the row of test tubes. This results in the advantage that the application of the strip is not too critical as regards its positioning in the longitudinal direction, since the ovality of the apertures admits a certain displacement in relation to the openings of the test tubes 17. The transverse adjustment of the strip will, however, not constitute any problem.

The invention is, of course, not delimited to the embodiment shown in the drawing. Thus, instead of the strip used a correspondingly designed sheet containing a plurality of parallel rows of apertures 7 corresponding to application to a test tube holder intended for a corresponding number of rows of test tubes may be used. Provided that layer 9 with absorbing ability has sufficient strength, the supporting layer 5 may be excluded and thereby, of course, also the protective layer 3, and in this case layer 9 may be attached in some form of frame, whereby the device may simply be positioned on to the openings of the test tubes. This embodiment would be particularly useful in test tube holders intended for several rows of test tubes.

What is claimed is:

1. A product for use in chemical working operations, for instance, pipetting, wherein at least one device, such as a pipette, is moved between, inserted into and withdrawn from the openings into a plurality of liquid containers arranged in a row with the product preventing undesirable transfer of liquid between the liquid containers, wherein the product comprises a strip-like member for covering the openings into the liquid containers, and said strip-like member includes a layer of absorbent material having the ability to wipe off and clean the exterior of the device when it penetrates the strip-like member, a supporting layer attached to said layer of absorbent material and said supporting layer having spaced apertures arranged to register with the openings into the liquid containers with the layer of absorbent material spanning the apertures, said supporting layer having a first surface in contact with the layer of absorbent material and an oppositely directed second surface, and a pressure-sensitive adhesive deposited on the second surface for attaching said strip-like member to the liquid containers.

2. A product according to claim 1, wherein the layer of absorbent material consists of fibers of cellulose.

3. A product according to claim 1, wherein the layer of absorbent material consists of porous paper.

4. A product according to claim 1, wherein the apertures in said supporting layer have an oval shape with the longitudinal axis of the oval shaped apertures oriented in the direction of the row of the liquid containers.

5. A product according to claim 1, wherein a removable protective layer is attached to and forms a cover over the adhesive on the second surface of said supporting layer.

6. A product according to claim 1, wherein said layer of absorbent material comprises at least two separate layers with each said separate layer being formed of a different material.

7. A product according to claim 6, wherein said separate layers of said layer of absorbent material comprises at least one layer of porous paper and at least one layer of a film material.

8. A product according to claim 6, wherein said separate layers of said layer of absorbent material comprises at least one layer of porous paper and at least one layer of a non-woven material.

* * * * *